United States Patent
Zhang

(10) Patent No.: US 10,558,807 B2
(45) Date of Patent: Feb. 11, 2020

(54) METHOD AND DEVICE FOR PROVIDING ACCESS PAGE

(71) Applicant: Alibaba Group Holding Limited, Grand Cayman (KY)

(72) Inventor: Lei Zhang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 245 days.

(21) Appl. No.: 15/482,609

(22) Filed: Apr. 7, 2017

(65) Prior Publication Data

US 2017/0213032 A1 Jul. 27, 2017

Related U.S. Application Data

(63) Continuation of application No. PCT/CN2015/091254, filed on Sep. 30, 2015.

(30) Foreign Application Priority Data

Oct. 17, 2014 (CN) .......................... 2014 1 0552882

(51) Int. Cl.
*G06F 21/57* (2013.01)
*G06F 16/958* (2019.01)
(Continued)

(52) U.S. Cl.
CPC ............ *G06F 21/57* (2013.01); *G06F 16/958* (2019.01); *H04L 29/06* (2013.01); *H04L 29/12* (2013.01);
(Continued)

(58) Field of Classification Search
CPC ................... G06F 21/57; G06F 16/958; G06F 2221/2119; H04L 29/06; H04L 29/12; H04L 63/14; H04L 63/1466
See application file for complete search history.

(56) References Cited

U.S. PATENT DOCUMENTS

| 7,343,626 B1 * | 3/2008 | Gallagher | ............. | G06F 21/577 |
| | | | | 707/999.003 |
| 8,225,402 B1 * | 7/2012 | Averbuch | ............. | G06F 21/554 |
| | | | | 717/141 |

(Continued)

FOREIGN PATENT DOCUMENTS

| CN | 101895516 A | 11/2010 |
| CN | 101902456 A | 12/2010 |

(Continued)

OTHER PUBLICATIONS

Wan et al., An Improved Eliminating SQL Injection Attacks Based Regular Expressions Matching, Dec. 2012, International Conference on Control Engineering and Communication Technology, pp. 210-212 (Year: 2012).*

(Continued)

*Primary Examiner* — Kenneth W Chang
(74) *Attorney, Agent, or Firm* — Lee & Hayes, P.C.

(57) ABSTRACT

A method and an apparatus of providing an access page are disclosed. The apparatus firstly obtains an access page that is sent by a network device and is to be provided to a user device, determines an XSS processing module corresponding to the access page, and forwards the XSS processing module and the access page to the user device, wherein the XSS processing module is executed to process XSS information on the access page when the access page is loaded by the user device. The disclosed apparatus can configure a processing module for detecting XSS information that is tailored to each access page, thus avoiding false negatives in detection of an access page in the existing technologies, and ensuring to prompt and stop anomalies on the access page in time when the access page is insecure.

20 Claims, 4 Drawing Sheets

(51) Int. Cl.
 *H04L 29/06* (2006.01)
 *H04L 29/12* (2006.01)
(52) U.S. Cl.
 CPC .......... *H04L 63/14* (2013.01); *H04L 63/1466* (2013.01); *G06F 2221/2115* (2013.01); *G06F 2221/2119* (2013.01)

(56) References Cited

U.S. PATENT DOCUMENTS

| | | | |
|---|---|---|---|
| 8,255,280 B1* | 8/2012 | Kay | G06F 21/53 705/26.1 |
| 8,578,482 B1* | 11/2013 | Yang | G06F 21/51 726/22 |
| 8,601,586 B1* | 12/2013 | Boutros | H04L 63/1433 709/217 |
| 8,752,183 B1* | 6/2014 | Heiderich | G06F 21/577 726/22 |
| 2005/0021791 A1* | 1/2005 | Sakiyama | H04L 63/168 709/229 |
| 2008/0263650 A1* | 10/2008 | Kerschbaum | G06F 21/6218 726/9 |
| 2009/0049547 A1* | 2/2009 | Fan | H04L 63/1425 726/22 |
| 2010/0218253 A1* | 8/2010 | Sutton | G06F 21/554 726/23 |
| 2011/0099294 A1* | 4/2011 | Kapur | H04L 67/02 709/246 |
| 2013/0055402 A1* | 2/2013 | Amit | H04L 63/1441 726/25 |
| 2013/0073382 A1* | 3/2013 | Henkin | G06Q 30/02 705/14.49 |
| 2014/0006924 A1* | 1/2014 | Tsolis | G06Q 30/0277 715/234 |
| 2014/0195690 A1* | 7/2014 | Harrison | H04L 12/189 709/228 |
| 2014/0373087 A1* | 12/2014 | Ciu | H04L 63/145 726/1 |
| 2015/0082424 A1* | 3/2015 | Shukla | H04L 63/123 726/22 |
| 2016/0182537 A1* | 6/2016 | Tatourian | H04L 63/1416 726/23 |

FOREIGN PATENT DOCUMENTS

| | | |
|---|---|---|
| CN | 103117998 A | 5/2013 |
| CN | 103634305 A | 3/2014 |
| CN | 103634329 A | 3/2014 |
| CN | 103856471 A | 6/2014 |
| CN | 103942497 A | 7/2014 |

OTHER PUBLICATIONS

Machine translation of first Chinese Office Action dated Jan. 10, 2018 for Chinese patent application No. 201410552882.2, a counterpart foreign application of U.S. Appl. No. 15/482,609, 7 pages.
Machine translation of second Chinese Office Action dated Nov. 14, 2018 for Chinese patent application No. 201410552882.2, a counterpart foreign application of U.S. Appl. No. 15/482,609, 8 pages.
The Chinese Search Report dated Jun. 6, 2016 for Chinese patent application No. 201410552882.2, 1 page.
Translation of International Search Report from corresponding PCT application No. PCT/CN2015/091254 dated Jan. 7, 2016, 2 pages.
Translation of Written Opinion from corresponding PCT application No. PCT/CN2015/091254 dated Jan. 1, 2016, 5 pages.

* cited by examiner

US 10,558,807 B2

METHOD AND DEVICE FOR PROVIDING ACCESS PAGE

CROSS REFERENCE TO RELATED PATENT APPLICATIONS

This application claims priority to and is a continuation of PCT Patent Application No. PCT/CN2015/091254, filed on 30 Sep. 2015, and which claims priority to and is related to Chinese Patent Application No. 201410552882.2, filed on 17 Oct. 2014, entitled "Method and Device for Providing Access Page," which are hereby incorporated by reference in their entirety.

TECHNICAL FIELD

The present disclosure relates to the field of computer technologies, and in particular, to a technology of providing an access page.

BACKGROUND

Cross Site Scripting (XSS) is currently the most common attack type on the Internet. An attacker may attack a WEB site through XSS to obtain sensitive information (for example, user name and password, etc.) of a WEB site user, forge a user identity, etc. Thus, XSS is one of the attack types that threatens the security of the WEB the most.

Currently, defense against a XSS attack is generally implemented in the following two manners:

1) Vulnerabilities on an access page are detected by collecting all URLs on a WEB site through WEB crawlers set in a vulnerability scanning system, constructing a special URL with an XSS attack attribute, initiating a detection request to all the URLs successively on the WEB site, and examining characters in results returned by a WEB server to determine whether a vulnerability exists on the page by the vulnerability scanning system. A WEB site administrator fixes the vulnerabilities on the WEB site according to the scanning results. However, this manner can only construct a vulnerability detection request after analysis of URL character strings in a page text using crawlers in this manner. In the era of WEB2.0, a large amount of scripts (JavaScript) are used on a WEB site to achieve dynamic effects. In addition to the dynamic generation of URLs, this makes the crawlers very difficult to collect URLs, resulting in false negatives for uncollected URLs. A detection principle of vulnerability scanning is to perform attack detection in a way of constructing an attack request and checking a response text. This type of static text detection method can only be used to discover some relatively simple vulnerabilities. The vulnerability scanning system is a general-purpose scanning system, which is used for discovering typical vulnerabilities in many web pages using some preset rules. However, vulnerability discovery methods used by attackers generally target at specific services on a website to perform deep mining. Some unknown means may also be used in this process, which is beyond the reach of the vulnerability scanning system.

2) A Web Application Firewall (WAF) technology is adopted to detect vulnerabilities in a page access request. A technical person deploys one or more sets of software and hardware of WAF systems before a WEB site. A page access request sent by a browser to a server needs to pass through the WAF systems first. The WAF systems detect characters in the request from the browser according to specific rules and determine whether an attack feature exists in the request. The WAF will block a malicious request, and allow a normal request to pass through. Disadvantages of this type of method includes: a WAF being deployed before a WEB site to receive and forward all requests that are sent to the WEB site. Due to performance limits, a WAF is only able to check static texts in requests sent to a WEB server according to rules, and effective against attack types such as SQL injection and Cross-site request forgery (CSRF), while being ineffective against elaborately constructed XSS attack requests. The WAF can only detect characters in a page access request. If a website has been under a stored XSS attack before a WAF is deployed, damages resulting from the attack cannot be detected or defended against even if the WAF is deployed subsequently.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or computer-readable instructions as permitted by the context above and throughout the present disclosure.

An objective of the present disclosure is to provide a method and an apparatus for providing an access page.

In implementations, a method for providing an access page is provided. The method may include obtaining an access page that is sent by a network device and is to be provided to a user device; determining an XSS processing module corresponding to the access page; and forwarding the XSS processing module and the access page to the user device, wherein the XSS processing module is executed to process XSS information on the access page when the access page is loaded by the user device.

In implementations, an apparatus for providing an access page is further provided. The apparatus may include a first module configured to obtain an access page that is sent by a network device and is to be provided to a user device; a second module configured to determine an XSS processing module corresponding to the access page; and a third module configured to forward the XSS processing module and the access page to the user device, wherein the XSS processing module is executed to process XSS information on the access page when the access page is loaded by the user device.

Compared with existing technologies, the present disclosure determines a matching XSS processing module for an obtained access page according to preset polic(ies), so that a processing module for detecting XSS information can be specifically configured for each access page, thereby avoiding false negatives when examining an access page in the existing technologies, Furthermore, the present disclosure sends the access page and the corresponding XSS processing module to a user device, and enables the XSS processing module to run when the access page is loaded, thereby ensuring to point out and stop anomalies on the access page in time when the access page is insecure.

BRIEF DESCRIPTION OF THE DRAWINGS

Other features, objectives, and advantages of the present disclosure become more apparent by reading the detailed description of non-limiting embodiments with reference to accompanying drawings as follows.

Figure 1:
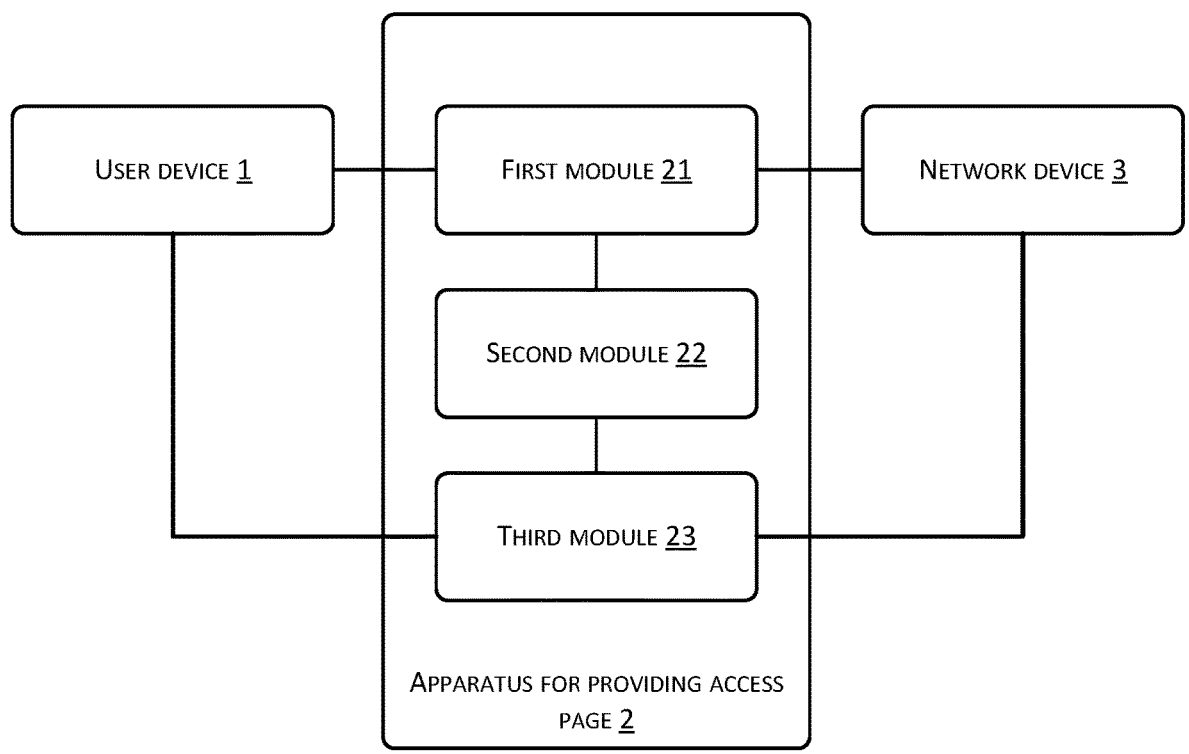
FIG. 1 is a schematic diagram of an apparatus of providing an access page according to an aspect of the present disclosure.

The same or similar reference labels in the drawings of the present disclosure represent the same or similar components.

DETAILED DESCRIPTION

The present disclosure is described in further detail hereinafter in conjunction with the accompanying drawings.

In a typical configuration of the present disclosure, a terminal, a device of a service network, and a trusted party each include one or more Central Processing Units (CPUs), input/output interfaces, network interfaces, and memory. The memory may include a form of computer-readable media, e.g., a non-permanent storage device, random-access memory (RAM) and/or a nonvolatile internal storage, such as read-only memory (ROM) or flash RAM. The memory is an example of computer-readable media. The computer-readable media may include a permanent or non-permanent type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer-readable media does not include transitory media, such as modulated data signals and carrier waves.

FIG. 1 shows an apparatus 2 for providing an access page according to an aspect of the present disclosure. In implementations, the apparatus 2 for providing an access page may include one or more computing devices. By way of example and not limitation, the apparatus 2 for providing an access page may include one or more processors, an input/output interface, a network interface, and memory. The memory is an example of computer-readable media as described in the foregoing description.

As shown in FIG. 1, the apparatus 2 for providing an access page includes a first module 21, a second module 22, and a third module 23. Specifically, the first module 21 obtains an access page that is sent by a network device 3 and is to be provided to a user device 1. The second module 22 determines an XSS processing module corresponding to the access page. The third module 23 forwards the XSS processing module and the access page to the user device 1. The XSS processing module is executed to process XSS information on the access page when the access page is loaded by the user device 1.

The apparatus 2 for providing an access page may be either shared with the network device 3, or located between the network device 3 and the user device 1. The apparatus 2 for providing an access page may be implemented by a network host, a single network server, multiple network server clusters, etc. One skilled in the art should understand that the apparatus 2 for providing an access page is merely provided as an example. Other existing or likely emerging apparatuses 2 for providing an access page, if being applicable to the present disclosure, may also fall in the scope of protection of the present disclosure, and are included herein by reference. The apparatus 2 for providing an access page includes an electronic device that is capable of automatically performing numerical computations and information processing according to an instruction which is configured or stored in advance. The hardware thereof includes, but not limited to, a microprocessor, an application specific integrated circuit (ASIC), a field programmable gate array (FPGA), a digital signal processor (DSP), an embedded device, and the like. The network device 3 includes, but not limited to, a WEB server, a server cluster, a cloud-based server terminal, etc. The user device 1 refers to any personal terminal that can access a web page over a network, and includes, but not limited to, a personal computer, a notebook computer, a mobile device, and the like.

Specifically, the user device 1 sends a page access request to the first module 21 according to an agreed-upon communication mode such as http or https, etc. The first module 21 forwards the page access request to the network device 3, to cause the network device 3 to find an access page to be fed back correspondingly. The first module 21 may be used as a forwarding device only, to enable a transparent transmission of the page access request between the user device 1 and the network device 3. The network device 3 may be a WEB server, for example.

In implementations, the first module 21 obtains a page access request that is submitted by the user device 1 to the network device 3, detects whether the page access request is a normal access request based on predefined attack request detection rules, forwards the page access request to the network device 3 if the page access request is a normal access request, and receives an access page that is sent by the network device 3 and is to be provided to the user device 1 according to the page access request. If the page access request is an abnormal access request, the first module 21 may directly reject the user device 1 to access the network device 3.

The preset attack request detection rules include:

1) detecting whether content included in the page access request contains preset attack information. For example, the first module 21 detects whether an SQL statement, Cross-site request forgery (CSRF), and the like, that is included in the page access request contains script information conforming to a format of preset script information, determines that the page access request is an abnormal access request if affirmative, and determines that the page access request is a normal access request otherwise. The preset script information includes, but not limited to, JavaScript script information. The attack information includes, but not limited to, whether the included SQL statement contains "<script . . . > . . . </script>", and the like.

2) detecting whether the page access request includes an address link that does not conform to a pre-stored link list of legitimate websites based on the link list. For example, the first module 21 detects whether a URL label of the page access request contains a link that does not belong to any pre-stored legitimate website pages, determines that the page access request is an abnormal access request if affirmative, and determines that the page access request is a normal access request otherwise.

In implementations, when determining that the received page access request is an abnormal request, the first module 21 may further perform screening according to the preset attack request detection rules. In response to determining that the page access request contains XSS information, the page access request is rejected. Otherwise, when the page access request is suspected to contain XSS information, the page access request is forwarded to the network device 3, and the second module 22 examines XSS information on an access page returned by the network device 3. A process performed by the second module 22 is described in detail later.

For example, in case when a corresponding page in the page access request received by the first module 21 can only be opened internally and a referrer parameter in the received page access request is null or a url of another site, the first module 21 determines that the page access request is suspected to be XSS information according to the preset detection rules. In this case, the first module 21 forwards the received page access request to the network device 3, to cause the network device 3 to return a corresponding access page. Furthermore, the page access request is also transmitted to the second module 22, to enable the second module 22 to determine an XSS processing module for the returned access page according to preset polic(ies).

The second module 22 may determine an XSS processing module corresponding to the returned access page according to a preset policy corresponding to each access page in the network device 3.

A method of determining a returned access page by the second module 22 includes:

1) extracting a returned access page from the page access request provided by the first module 21. For example, the page access request contains a name of a page to be accessed, through which the second module 22 determines a returned access page.

2) determining a returned access page by the second module 22 accordingly from a name of the returned access page that is received and provided by the third module 23 to the second module 22. For example, the first module 21 forwards the received page access request to the network device 3. The network device 3 sends a returned access page to the third module 23, and the third module 23 provides a name of the access page to the second module 22. The second module 22 determines the returned access page accordingly.

The preset policy corresponding to each access page in the network device 3 may be pre-configuration of a corresponding XSS processing module for each access page in the network device 3, or a determination of a corresponding XSS processing module according to each piece of page type information. The page type information includes, but not limited to, a public page, a login page, a personalized page after login, a back-end page, etc.

Especially for a login page and a back-end page, when the obtained access page is a login page, the second module 22 determines an XSS processing module corresponding to the access page, with the XSS processing module including security information against a theft of form content. When the obtained access page is a back-end page, the second module 22 determines an XSS processing module corresponding to the access page, with the XSS processing module including security information for detecting an abnormal external resource access.

For example, the second module 22 determines that the obtained access page is a login page by matching the name of the obtained access page with pre-stored names of login pages, and determines an XSS processing module for the obtained login page according to a preset correspondence relationship between the login pages and XSS processing modules. The XSS processing module, when executed, detects whether the login page contains attack information for stealing form content such as a user name, a password, a security question, and a security answer on the login page.

For another example, the second module 22 determines that the obtained access page is a back-end page by matching the name of the obtained access page with pre-stored names of back-end pages, and determines an XSS processing module for the obtained back-end page according to a preset correspondence relationship between the back-end pages and XSS processing modules. The XSS processing module, when executed, detects whether the back-end page contains security information against an abnormal external resource access to an external link address, a script for reading a user name and a password, etc.

This is particularly aimed at a situation when the first module 21 also provides the page access request to the second module 22 while forwarding the page access request. The second module 22 extracts access-related information included in the page access request, and determines an XSS processing module corresponding to the access page returned by the network device 3 according to preset policies formed by various types of access-related information. The access-related information includes any information related to a page to be accessed, a browser at a terminal of the user device 1, etc., which includes, but not limited to, at least one of browser type information of the user device 1, page type information of the access page, and access source information of the access page.

Specifically, when the page access request contains browser type information of the user device 1, the second module 22 determines an XSS processing module corresponding to the access page upon determining that the browser type information of the user device 1 includes a supported CSP response header, with the XSS processing module including security policy information configured in a CSP response header corresponding to the access page. If the browser type information of the user device 1 includes a non-supported CSP response header, an XSS processing module corresponding to the access page is determined, with the XSS processing module includes security information for detecting XSS information on the access page and intercepting and reporting illegitimate references of external resources.

For example, browser type information extracted by the second module 22 from the page access request is IE9. An XSS processing module corresponding to the IE9 is obtained according to a preset correspondence relationship between a browser type and the XSS processing module. The XSS processing module corresponding to the IE9, when executed, can inform a browser application of several security policies to restrict resource requests such as iframe, img, script, link on a page, thereby configuring security policy information for a CSP response header corresponding to the access page.

For another example, the page access request contains a browser type of IE7, and the second module 22 determines a corresponding XSS processing module. The determined XSS processing module, when executed, detects XSS information on the returned access page, and intercepts and reports corresponding alarm information to a user if an illegitimate reference of an external resource exists.

It should be noted that one skilled in the art should understand the aforementioned browser type merely provided as an example. Other existing or likely emerging browser types (IE10, IE11, WAP browser, etc.), if applicable to the present disclosure, may also fall within the scope of protection of the present disclosure, and are provided herein by reference.

When the page access request contains page type information of the access page, the second module 22 obtains an XSS processing module corresponding to the page type information that is parsed from a preset correspondence relationship between the page type information and the XSS processing module. The page type information includes, but not limited to, a login page, a back-end page, and the like.

It should be noted that one skilled in the art should understand that methods for the second module 22 to determine respective XSS processing modules corresponding to access pages based on a login page and a back-end page in the present embodiment are identical or similar to the methods for the second module 22 to determine respective XSS processing modules corresponding to access pages based on a login page and a back-end page in the previous embodiment. Therefore, the details thereof are not repeatedly described herein.

When the page access request contains access source information that the access page is opened internally, the second module 22 determines an XSS processing module that can stop page redirection or prompt security alarm information if determining that content in header information named "referrer" in the page access request is null or a link to another site. On the contrary, the second module 22 determines an XSS processing module that can detect an abnormal illegitimate reference of an external resource.

For example, an access page A1 corresponding to a page access request is a web page embedded in another access page A2. Therefore, content in "referrer" header information of the page access request is A2. However, content in the "referrer" header information that is obtained by the second module 22 is null. As such, the second module 22 determines an XSS processing module that can prompt security alarm information according to a corresponding policy, and provide thereof to the third module 23.

It should be noted that the policies formed by various types of access-related information and set by the second module 22 may be set merely according to one of the above three types of access-related information, or the policies of each type of access-related information can be combined or optimized. After determining the XSS processing module, the second module 22 provides the determined XSS processing module to the third module 23.

The third module 23 forwards the XSS processing module provided by the second module 22 and the access page to the user device 1. The XSS processing module is executed to process XSS information on the access page when the user device 1 loads the access page.

A method for the third module 23 to forward an XSS processing module and an access page to the user device 1 includes, but not limited to:

1) adding the XSS processing module into the access page; and forwarding the access page that includes the XSS processing module to the user device 1. For example, the XSS processing module may be a script, and the third module 23 adds the XSS processing module in header information of the access page to combine the XSS processing module into the header information of the access page, and forwards the combined access page to the user device 1.

2) adding an invocation statement for invoking the XSS processing module in the header information of the access page, and sending the XSS processing module and the access page after the addition to the user device 1 in an out-of-line manner. For example, the third module 23 adds <script type="text/javascript" src="http://dir/js/xssdetect.js"></script> in the HTTP header information of the access page, and sends thereof to the user device 1. When parsing the access page, the user device 1 downloads and runs the XSS processing module named xssdetect.js according to the http://dir/js/xssdetect.js address in the HTTP header information.

The XSS processing module, when executed, is configured to process the XSS information on the access page. Details of the process include:

1) detecting whether the access page includes XSS information; and stopping an execution of the XSS information if the access page includes XSS information, or allowing a browser to normally parse the access page otherwise. For example, when loading the access page, the browser in the user device 1 runs the XSS processing module according to the XSS processing module in the header information. The XSS processing module detects whether a link label, a form label, etc., on the access page contains XSS information. If affirmative, an execution of the XSS information is stopped. If not, the browser normally parses and displays the access page. The XSS information generally exists in a form of a script.

2) detecting whether the access page includes XSS-like information; and reporting the XSS-like information if the access page includes XSS-like information, or allowing the browser to normally parse the access page otherwise. For example, when loading the access page, the browser in the user device 1 runs the XSS processing module according to the XSS processing module in the header information. The XSS processing module detects whether a link label, a form label and the like on the access page contains XSS-like information that is suspected to be XSS information. If affirmative, a security warning indicating that the currently displayed access page contains a suspected XSS attack is prompted in the browser to the user. If not, the browser parses and displays the access page as normal. Determining the XSS-like information may include considering a script as XSS-like information if a detected label contains the script and the script is not completely the same as a preset format of an XSS attack script. In implementations, after determining the XSS-like information, the XSS processing module sends the XSS-like information to the apparatus 2 for providing an access page or other network devices 3 via a network, to facilitate a technical person to perform a further analysis of the XSS-like information.

Figure 2:
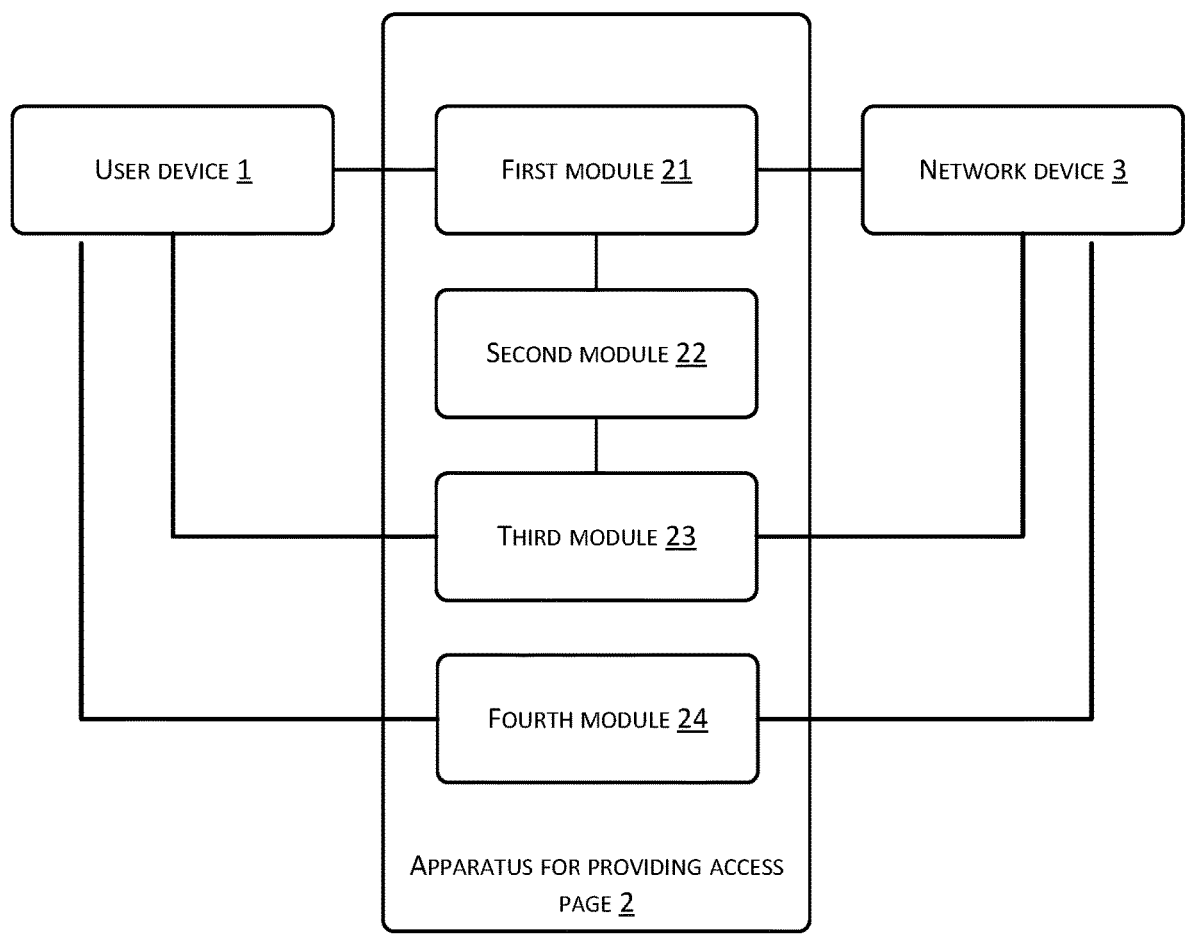
FIG. 2 is a schematic diagram of an apparatus of providing an access page according to an embodiment of the present disclosure.

In implementations, XSS processing rules in the XSS processing module change with continuous updates and innovations of the XSS information. Therefore, the apparatus 2 for providing an access page further includes a fourth module 24 in addition to the first module 21, the second module 22, and the third module 23 as shown in FIG. 2.

Specifically, when forwarding the page access request of the user device 1 to the network device 3, the first module 21 also provides the page access request to the second module 22. The second module 22 extracts access-related information from the page access request, and determines an XSS processing module for the access page corresponding to the page access request according to a policy corresponding to the access-related information. When the network device 3 forwards the returned access page to the third module 23, the third module 23 forwards the XSS processing module determined by the second module 22 and the access page together to the user device 1. When the user device 1 runs the XSS processing module, the XSS processing module sends XSS-like information to the fourth module 24 when discovering the XSS-like information. The fourth module 24 creates or updates XSS processing rules that are used for generating a subsequent XSS processing module based on the XSS-like information.

The working process of the first module 21, the second module 22, and the third module 23 is identical or similar to the working process of the first module 21, the second module 22, and the third module 23 in the previous embodiment, and the details thereof are not repeatedly described herein.

A method for the fourth module 24 to create XSS processing rules that are used for generating a subsequent XSS processing module based on XSS-like information includes, but not limited to, creating a new XSS processing module through the fourth module 24 according to processing rules of XSS-like information analyzed and determined by a technical person to be XSS information.

A method for the fourth module 24 to update XSS processing rules that are used for generating a subsequent XSS processing module based on XSS-like information includes, but not limited to, further analyzing the received XSS-like information by the fourth module 24 using preset features of XSS information, and adding corresponding processing rules into existing processing rules of an XSS module according to rules of modified XSS information in response to determining that the XSS-like information is the modified XSS information.

Figure 3:
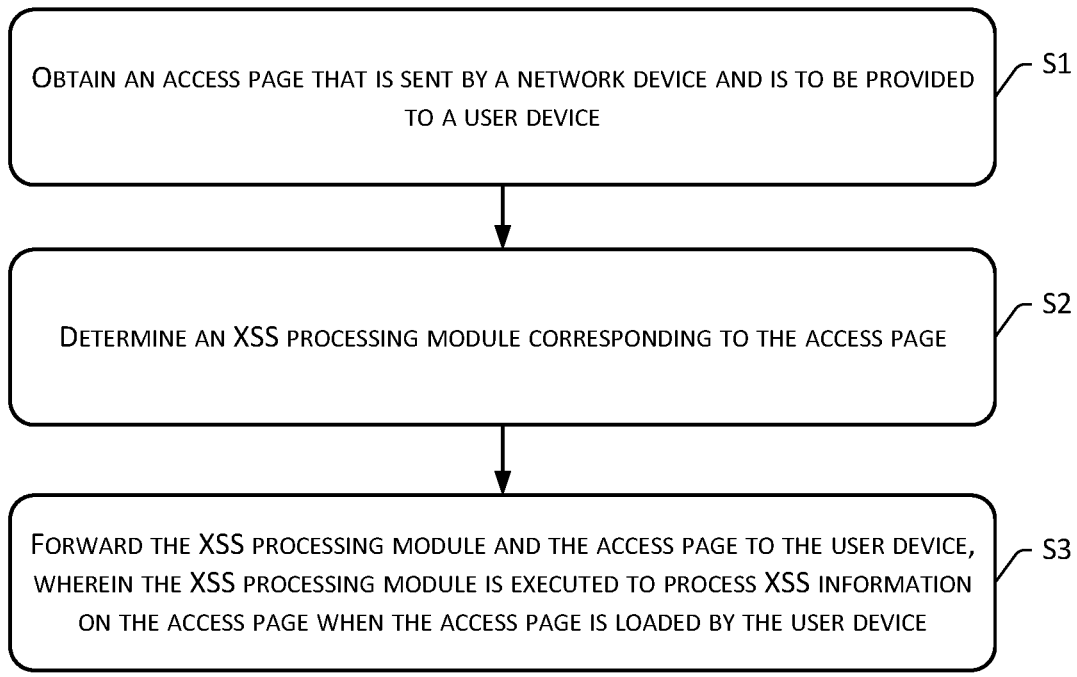
FIG. 3 is a flowchart of a method of providing an access page according to another aspect of the present disclosure.

FIG. 3 shows a method for providing an access page according to an aspect of the present disclosure. The method for providing an access page includes steps S1, S2, and S3. The method for providing an access page is mainly executed by the apparatus for providing an access page.

At step S1, the apparatus for providing an access page obtains an access page that is sent by a network device and is to be provided to a user device. At step S2, the apparatus for providing an access page determines an XSS processing module corresponding to the access page. At step S3, the apparatus for providing an access page forwards the XSS processing module and the access page to the user device. The XSS processing module is executed to process XSS information on the access page when the access page is loaded by the user device.

The apparatus for providing an access page may be either shared with the network device, or located between the network device and the user device. The apparatus for providing an access page may be implemented by a network host, a single network server, multiple network server clusters, etc. One skilled in the art should understand that the apparatus for providing an access page is merely provided as an example. Other existing or likely emerging apparatuses for providing an access page, if being applicable to the present disclosure, may also fall within the scope of protection of the present disclosure and are provided herein by reference. The apparatus for providing an access page includes an electronic device that is capable of automatically performing numerical computations and information processing according to an instruction which is configured or stored in advance. The hardware thereof includes, but not limited to, a microprocessor, an application specific integrated circuit (ASIC), a field programmable gate array (FPGA), a digital signal processor (DSP), an embedded device and the like. The network device includes, but not limited to, a WEB server, a server cluster, a cloud-based server terminal, etc. The user device refers to any personal terminal that can access a web page over a network, and includes, but not limited to, a personal computer, a notebook computer, a mobile device, and the like.

Specifically, the user device sends a page access request to the apparatus for providing an access page according to an agreed-upon communication mode such as http or https, etc. The apparatus for providing an access page forwards the page access request to the network device, to enable the network device to find an access page to be fed back correspondingly. The apparatus for providing an access page only forwards the page access request, to allow the page access request to be transmitted between the user device and the network device transparently. The network device may be a WEB server, for example.

In implementations, the apparatus for providing an access page obtains a page access request that is submitted by the user device to the network device, detects whether the page access request is a normal access request based on predefined attack request detection rules, forwards the page access request to the network device if the page access request is a normal access request, and receives an access page that is sent by the network device and is to be provided to the user device according to the page access request. If the page access request is an abnormal access request, the apparatus for providing an access page may directly reject the user device to access the network device.

The preset attack request detection rules include:

1) detecting whether content included in the page access request contains preset attack information. For example, the apparatus for providing an access page detects whether an SQL statement, Cross-site request forgery (CSRF), and the like, that is included in the page access request contains script information conforming to a format of preset script information, determines that the page access request is an abnormal access request if affirmative, and determines that the page access request is a normal access request otherwise. The preset script information includes, but not limited to, JavaScript script information. The attack information includes, but not limited to, whether the included SQL statement contains "<script . . . > . . . </script>", and the like.

2) detecting whether the page access request includes an address link that does not conform to a pre-stored link list of legitimate websites based on the link list. For example, based on a predefined link list, the apparatus for providing an access page detects whether a url label of the page access request contains a link that does not belong to any pre-stored legitimate website pages, determines that the page access request is an abnormal access request if affirmative, and determines that the page access request is a normal access request otherwise.

In implementation, when determining that the received page access request is an abnormal request, the apparatus for providing an access page may further perform screening according to the preset attack request detection rules. In response to determining that the page access request contains XSS information, the page access request is rejected. Otherwise, when the page access request is suspected to contain XSS information, the page access request is forwarded to the network device, and the apparatus for providing an access page examines XSS information on an access page returned by the network device. A process performed by the apparatus for providing an access page is described in detail later.

For example, in case when a corresponding page in the page access request received by the apparatus for providing an access page can only be opened internally and a referrer parameter in the received page access request is null or a url of another site, the apparatus for providing an access page determines that the page access request is suspected to be XSS information according to the preset detection rules. In this case, the apparatus for providing an access page forwards the received page access request to the network device, to cause the network device to return a corresponding access page, and further determine an XSS processing module for the returned access page according to preset polic(ies).

The apparatus for providing an access page may determine an XSS processing module corresponding to the returned access page according to a preset policy corresponding to each access page in the network device.

A method of determining a returned access page by the apparatus for providing an access page includes:

1) extracting a returned access page from the page access request provided by the apparatus for providing an access page. For example, the page access request contains a name of a page to be accessed, through which the apparatus for providing an access page determines a returned access page.

2) determining a returned access page based on a name of the returned access page. For example, the apparatus for providing an access page forwards the received page access request to the network device. The network device sends a returned access page to the apparatus for providing an access page, and the apparatus for providing an access page determines the returned access page based on a name of the access page.

The preset policy corresponding to each access page in the network device may be pre-configuration of a corresponding XSS processing module for each access page in the network device, or a determination of a corresponding XSS processing module according to each piece of page type information. The page type information includes, but not limited to, a public page, a login page, a personalized page after login, a back-end page, etc.

Especially for a login page and a back-end page, when the obtained access page is a login page, the apparatus for providing an access page determines an XSS processing module corresponding to the access page, with the XSS processing module including security information against a theft of form content. When the obtained access page is a back-end page, the apparatus for providing an access page determines an XSS processing module corresponding to the access page, with the XSS processing module including security information for detecting an abnormal external resource access.

For example, the apparatus for providing an access page determines that the obtained access page is a login page by matching the name of the obtained access page with pre-stored names of login pages, and determines an XSS processing module for the obtained login page according to a preset correspondence relationship between the login pages and XSS processing modules. The XSS processing module, when executed, detects whether the login page contains attack information for stealing form content such as a user name, a password, a security question, and a security answer on the login page.

For another example, the apparatus for providing an access page determines that the obtained access page is a back-end page by matching the name of the obtained access page with pre-stored names of back-end pages, and determines an XSS processing module for the obtained back-end page according to a preset correspondence relationship between the back-end pages and XSS processing modules. The XSS processing module, when executed, detects whether the back-end page contains security information against an abnormal external resource access to an external link address, a script for reading a user name and a password, etc.

This is particularly aimed at a situation when the apparatus for providing an access page forwards the page access request and also parses the page access request. The apparatus for providing an access page extracts access-related information included in the page access request, and determines an XSS processing module corresponding to the access page returned by the network device according to preset policies formed by various types of access-related information. The access-related information includes any information related to a page to be accessed, a browser at a terminal of the user device, etc., which includes, but not limited to, at least one of browser type information of the user device, page type information of the access page, and access source information of the access page.

Specifically, when the page access request contains browser type information of the user device, the apparatus for providing an access page determines an XSS processing module corresponding to the access page upon determining that the browser type information of the user device includes a supported CSP response header, with the XSS processing module including security policy information configured in a CSP response header corresponding to the access page. If the browser type information of the user device includes a non-supported CSP response header, an XSS processing module corresponding to the access page is determined, with the XSS processing module includes security information for detecting XSS information on the access page and intercepting and reporting illegitimate references of external resources.

For example, browser type information extracted by the apparatus for providing an access page from the page access request is IE9. An XSS processing module corresponding to the IE9 is obtained according to a preset correspondence relationship between a browser type and the XSS processing module. The XSS processing module corresponding to the IE9, when executed, can inform a browser application of a number of security policies to restrict resource requests such as iframe, img, script, link on a page, thereby configuring security policy information for a CSP response header corresponding to the access page.

For another example, the page access request contains a browser type of IE7, and the apparatus for providing an access page determines a corresponding XSS processing module. The determined XSS processing module, when executed, detects XSS information on the returned access page, and intercepts and reports corresponding alarm information to a user if an illegitimate reference of an external resource exists.

It should be noted that one skilled in the art should understand the aforementioned browser type merely provided as an example. Other existing or likely emerging browser types (IE10, IE11, WAP browser, etc.), if applicable to the present disclosure, may also fall within the scope of protection of the present disclosure, and are provided herein by reference.

When the page access request contains page type information of the access page, the apparatus for providing an access page obtains an XSS processing module corresponding to the page type information that is parsed from a preset correspondence relationship between the page type information and the XSS processing module. The page type information includes, but not limited to, a login page, a back-end page, and the like.

It should be noted that one skilled in the art should understand that methods for the apparatus for providing an access page to determine respective XSS processing modules corresponding to access pages based on a login page and a back-end page in the present embodiment are identical or similar to the methods for determining respective XSS processing modules corresponding to access pages based on a login page and a back-end page in the previous embodiment. Therefore, the details thereof are not repeatedly described herein.

When the page access request contains access source information that the access page is opened internally, the apparatus for providing an access page determines an XSS processing module that can stop page redirection or prompt security alarm information if determining that content in header information named "referrer" in the page access request is null or a link to another site. On the contrary, the apparatus for providing an access page determines an XSS processing module that can detect an abnormal illegitimate reference of an external resource.

For example, an access page A1 corresponding to a page access request is a web page embedded in another access page A2. Therefore, content in "referrer" header information of the page access request is A2. However, content in the "referrer" header information that is obtained by the apparatus for providing an access page is null. As such, the apparatus for providing an access page determines an XSS processing module that can prompt security alarm information according to a corresponding policy.

It should be noted that the policies formed by various types of access-related information and set by the apparatus for providing an access page may be set merely according to one of the above three types of access-related information, or the policies of each type of access-related information can be combined or optimized. After the second module 22 determines the XSS processing module, step S3 is performed.

At step S3, the apparatus for providing an access page forwards the XSS processing module provided by the apparatus for providing an access page and the access page to the user device. The XSS processing module is executed to process XSS information on the access page when the user device loads the access page.

A method for the apparatus for providing an access page to forward an XSS processing module and an access page to the user device includes, but not limited to:

1) adding the XSS processing module into the access page; and forwarding the access page that includes the XSS processing module to the user device. For example, the XSS processing module may be a script, and the apparatus for providing an access page adds the XSS processing module in header information of the access page to combine the XSS processing module into the header information of the access page, and forwards the combined access page to the user device.

2) adding an invocation statement for invoking the XSS processing module in the header information of the access page, and sending the XSS processing module and the access page after the addition to the user device in an out-of-line manner. For example, the apparatus for providing an access page adds <script type="text/javascript" src="http://dir/js/xssdetect.js"></script> in the HTTP header information of the access page, and sends thereof to the user device. When parsing the access page, the user device downloads and runs the XSS processing module named xssdetect.js according to the http://dir/js/xssdetect.js address in the HTTP header information.

The XSS processing module, when executed, is configured to process the XSS information on the access page. Details of the process include:

1) detecting whether the access page includes XSS information; and stopping an execution of the XSS information if the access page includes XSS information, or allowing a browser to normally parse the access page otherwise. For example, when loading the access page, the browser in the user device runs the XSS processing module according to the XSS processing module in the header information. The XSS processing module detects whether a link label, a form label, etc., on the access page contains XSS information. If affirmative, an execution of the XSS information is stopped. If not, the browser normally parses and displays the access page. The XSS information generally exists in a form of a script.

2) detecting whether the access page includes XSS-like information; and reporting the XSS-like information if the access page includes XSS-like information, or allowing the browser to normally parse the access page otherwise. For example, when loading the access page, the browser in the user device runs the XSS processing module according to the XSS processing module in the header information. The XSS processing module detects whether a link label, a form label and the like on the access page contains XSS-like information that is suspected to be XSS information. If affirmative, a security warning indicating that the currently displayed access page contains a suspected XSS attack is prompted in the browser to the user. If not, the browser parses and displays the access page as normal. Determining the XSS-like information may include considering a script as XSS-like information if a detected label contains the script and the script is not completely the same as a preset format of an XSS attack script. In implementations, after determining the XSS-like information, the XSS processing module sends the XSS-like information to the apparatus for providing an access page or other network devices via a network, to facilitate a technical person to perform a further analysis of the XSS-like information.

Figure 4:
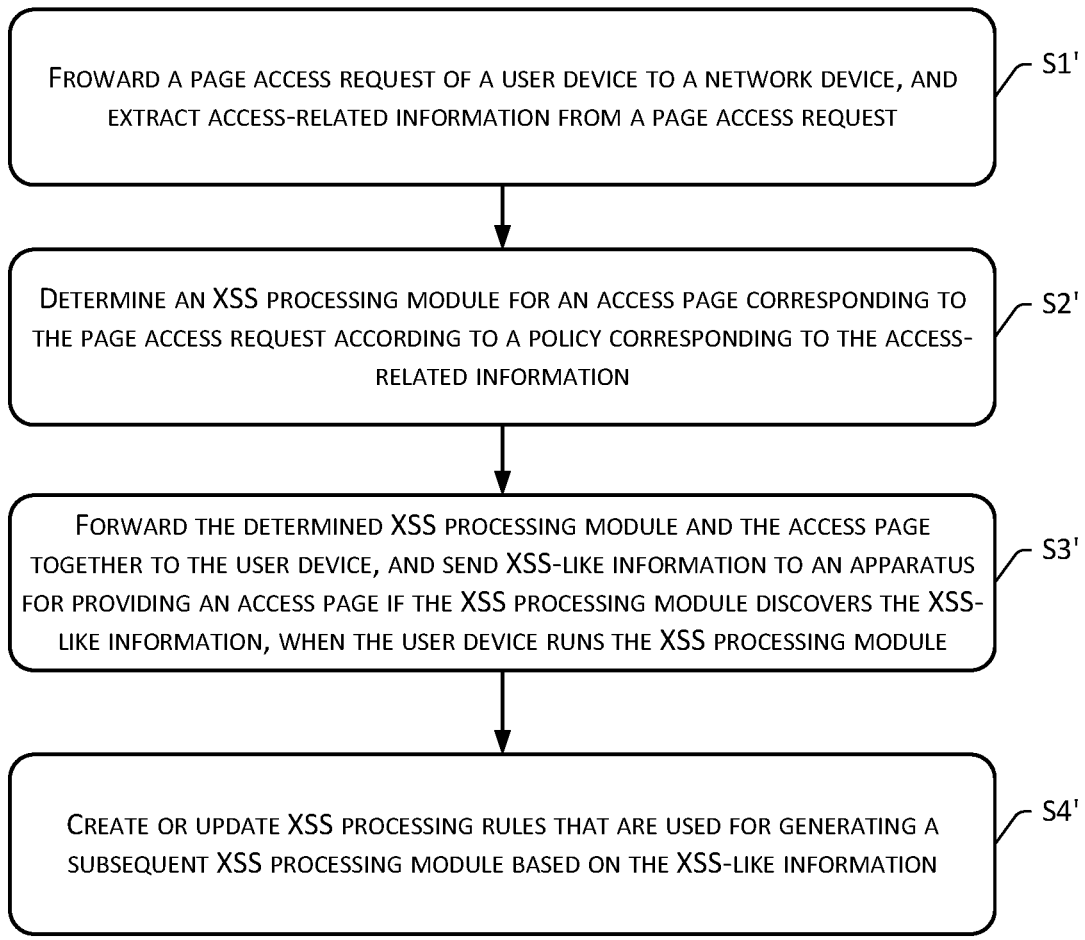
FIG. 4 is a flowchart of a method of providing an access page according to an embodiment of the present disclosure.

In implementations, XSS processing rules in the XSS processing module change with continuous updates and innovations of the XSS information. Accordingly, the method for providing an access page includes S1', S2', S3', and S4' as shown in FIG. 4.

Specifically, at step S1', when forwarding a page access request of a user device to a network device, the apparatus for providing an access page also extracts access-related information from the page access request. Step S2' is then performed, in which the apparatus for providing an access page determines an XSS processing module for an access page corresponding to the page access request according to a policy corresponding to the access-related information. When the network device forwards a returned access page to the apparatus for providing an access page, the apparatus for providing an access page performs step S3', i.e., forwards the determined XSS processing module and the access page together to the user device. When the user device runs the XSS processing module, the XSS processing module sends XSS-like information to the apparatus for providing an access page when discovering the XSS-like information. The apparatus for providing an access page performs step S4', i.e., creates or updates XSS processing rules that are used for generating a subsequent XSS processing module based on the XSS-like information.

Steps S1', S2', S3', and S4' are identical or similar to S1, S2, S3, and S4 in the previous embodiment, and the details thereof are not repeatedly described herein.

A method for the apparatus for providing an access page to create XSS processing rules that are used for generating a subsequent XSS processing module based on XSS-like information includes, but not limited to, creating a new XSS processing module through the apparatus for providing an access page according to processing rules of XSS-like information analyzed and determined by a technical person to be XSS information.

A method for the apparatus for providing an access page to update XSS processing rules that are used for generating a subsequent XSS processing module based on XSS-like information includes, but not limited to, further analyzing the received XSS-like information by the apparatus for providing an access page using preset features of XSS information, and adding corresponding processing rules into existing processing rules of an XSS module according to rules of modified XSS information in response to determining that the XSS-like information is the modified XSS information.

In view of the above, the method and the apparatus of providing an access page in the present disclosure determine a matching XSS processing module for an obtained access page according to a preset policy, and can configure a specific processing module for detecting XSS information for each access page, thereby avoiding false negatives in detection of an access page in the existing technologies. Furthermore, the present disclosure sends the access page and the corresponding XSS processing module to a user device, and the XSS processing module is enabled to run when the access page is loaded, thereby ensuring to prompt or stop anomalies on the access page in time when the access page is insecure. Moreover, when the user device sends a page access request, the page access request is examined, thereby effectively stopping an attack of XSS information to the network device. As such, the apparatus is not only a firewall at a terminal of the user device, but also a firewall for the network device. Furthermore, when an access page detected by the XSS processing module contains XSS-like information, the XSS-like information is provided to the apparatus. The apparatus updates or creates corresponding processing rules accordingly, so that the XSS processing module can change as XSS information changes, thus facilitating to process newly emerging XSS information on a network in time. Therefore, the present disclosure effectively eliminates the deficiencies in the existing technologies and has a high industrial utilization value.

It should be noted that the present disclosure may be implemented in software and/or a combination of software and hardware. For example, the present disclosure may be implemented by an application specific integrated circuit (ASIC), a general-purpose computer or any other similar hardware device. In an embodiment, a software program of the present disclosure may be executed by a processor to achieve the steps or functions described above. Similarly, a software program (including a related data structure) of the present disclosure can be stored in a computer readable recording media, for example, a RAM memory, a magnetic or optical drive or a floppy disk and similar devices. In addition, some steps or functions of the present disclosure may be implemented using hardware, for example, a circuit that performs various steps or functions in cooperation with a processor.

In addition, a part of the present disclosure can be applied as a computer program product, for example, computer program instructions that, when executed by a computer, call or provide the method and/or the technical solution of the present disclosure through operations of the computer. The program instructions that call the method of the present disclosure may be stored in a fixed or removable recording media, and/or transmitted through broadcasting or data streams in other signal carrier media, and/or stored in a working memory of a computing device that runs according to the program instructions. An embodiment of the present disclosure includes an apparatus. The apparatus includes a storage device configured to store computer program instructions and processor(s) configured to execute the program instructions. When the computer program instructions are executed by the processor(s), the apparatus is triggered to run the method and/or the technical solution based on the multiple embodiments of the present disclosure.

For one skilled in the art, it is apparent that the present disclosure is not limited to the details of the foregoing exemplary embodiments, and the present disclosure can be implemented in other specific forms without departing from the spirit or basic features of the present disclosure. From whatever perspective, the embodiments are therefore regarded as exemplary, and not limiting. The scope of the present disclosure is defined by the appended claims instead of the foregoing description. Thus, the present disclosure is intended to cover all modifications that fall in the meaning and scope of the equivalent elements of the claims. None of the reference labels in the claims should be regarded as limiting the involved claims. In addition, it is apparent that the term "include" does not exclude other units or steps, and a singular form does not exclude a plural form. Multiple units or apparatuses stated in the apparatus claims may also be implemented by a single unit or apparatus through software or hardware. Terms such as "first" and "second" are used to represent names, but do not represent any specific order.

What is claimed is:

1. A method implemented by a computing device, the method comprising:
    obtaining an access page that is sent by a network device and is to be provided to a user device, wherein obtaining the access page that is sent by the network device and is to be provided to the user device comprises:
        obtaining a page access request submitted by the user device to the network device; and
        detecting whether the page access request is a normal access request according to preset attack request detection rules, the preset attack request detection rules comprising at least detecting whether an SQL statement that is included in the page access request includes script information conforming to a format of preset script information;
    determining an XSS processing module corresponding to the access page; and
    forwarding the XSS processing module and the access page to the user device.

2. The method according to claim 1, wherein obtaining the access page that is sent by the network device and is to be provided to the user device further comprises:
    forwarding the page access request to the network device, and receiving the access page that is sent by the network device and is to be provided to the user device based on the page access request if the page access request is the normal access request.

3. The method according to claim 1, wherein forwarding the XSS processing module and the access page to the user device further comprises:

forwarding the access page that includes the XSS processing module to the user device.

4. The method according to claim 1, wherein the XSS processing module is executed to process XSS information on the access page when the access page is loaded by the user device, and processing the XSS information on the access page comprises:
   detecting whether the access page includes XSS information, and stopping an execution of the XSS information if the access page includes the XSS information; or
   detecting whether the access page includes XSS-like information, and reporting the XSS-like information if the access page includes the XSS-like information.

5. The method according to claim 4, further comprising obtaining the XSS-like information, and creating or updating XSS processing rules for generating a subsequent XSS processing module based on the XSS-like information.

6. The method according to claim 1, wherein determining the XSS processing module corresponding to the access page comprises determining the XSS processing module corresponding to the access page according to access-related information corresponding to the access page.

7. The method according to claim 6, wherein the access-related information comprises at least one of browser type information of the user device, page type information of the access page, or access source information of the access page.

8. The method according to claim 7, wherein the access-related information comprises the browser type information of the user device, and wherein determining the XSS processing module corresponding to the access page comprises:
   if the browser type information of the user device includes a supported CSP response header, determining the XSS processing module as an XSS processing module including security policy information configured in the CSP response header corresponding to the access page; or
   if the browser type information of the user device includes a non-supported CSP response header, determining the XSS processing module as an XSS processing module including security information for detecting XSS information on the access page, and intercepting and reporting an illegitimate reference of an external resource.

9. The method according to claim 7, wherein the access-related information comprises the page type information of the access page, and wherein determining the XSS processing module corresponding to the access page comprises:
   if the page type information of the user device includes a login page, determining the XSS processing module as an XSS processing module including security information against a theft of form content; or
   if the page type information of the user device includes a back-end page, determining the XSS processing module as an XSS processing module including security information for detecting an abnormal external resource access.

10. An apparatus comprising:
    one or more processors;
    memory;
    a first module stored in the memory and executable by the one or more processors to obtain an access page that is sent by a network device and is to be provided to a user device, wherein obtaining the access page that is sent by the network device and is to be provided to the user device comprises:
        obtaining a page access request submitted by the user device to the network device; and
        detecting whether the page access request is a normal access request according to preset attack request detection rules, the preset attack request detection rules comprising at least detecting whether an SQL statement that is included in the page access request includes script information conforming to a format of preset script information;
    a second module stored in the memory and executable by the one or more processors to determine an XSS processing module corresponding to the access page; and
    a third module stored in the memory and executable by the one or more processors to forward the XSS processing module and the access page to the user device.

11. The apparatus according to claim 10, wherein the first module is further configured to:
    forward the page access request to the network device, and receive the access page that is sent by the network device and is to be provided to the user device based on the page access request if the page access request is the normal access request.

12. The apparatus according to claim 10, wherein the third module is further configured to:
    forward the access page that includes the XSS processing module to the user device.

13. The apparatus according to claim 10, wherein the XSS processing module is executed to process XSS information on the access page when the access page is loaded by the user device, and processing the XSS information on the access page comprises:
    detecting whether the access page includes the XSS information, and stopping an execution of the XSS information if the access page includes the XSS information; or
    detecting whether the access page includes XSS-like information, and reporting the XSS-like information if the access page includes the XSS-like information.

14. The apparatus according to claim 13, further comprising a fourth module configured to obtain the XSS-like information, and create or update XSS processing rules for generating a subsequent XSS processing module based on the XSS-like information.

15. The apparatus according to claim 10, wherein the second module is configured to determine an XSS processing module corresponding to the access page according to access-related information corresponding to the access page.

16. The apparatus according to claim 15, wherein the access-related information comprises at least one of browser type information of the user device, page type information of the access page, or access source information of the access page.

17. The apparatus according to claim 16, wherein the access-related information comprises the browser type information of the user device, and wherein the second module is configured to:
    if the browser type information of the user device includes a supported CSP response header, determine the XSS processing module as an XSS processing module including security policy information configured in the CSP response header corresponding to the access page; or
    if the browser type information of the user device includes a non-supported CSP response header, determine the XSS processing module as an XSS processing module including security information for detecting XSS information on the access page, and intercepting and reporting an illegitimate reference of an external resource.

18. The apparatus according to claim 16, wherein the access-related information comprises the page type information of the access page, and wherein the second module is configured to:
- if the page type information of the user device includes a login page, determine the XSS processing module as an XSS processing module including security information against theft of form content; or
- if the page type information of the user device includes a back-end page, determine the XSS processing module as an XSS processing module including security information for detecting an abnormal external resource access.

19. One or more computer-readable media storing executable instructions that, when executed by one or more processors, cause the one or more processors to perform acts comprising:
- obtaining an access page that is sent by a network device and is to be provided to a user device, wherein obtaining the access page that is sent by the network device and is to be provided to the user device comprises:
  - obtaining a page access request submitted by the user device to the network device; and
  - detecting whether the page access request is a normal access request according to preset attack request detection rules, the preset attack request detection rules comprising at least detecting whether an SQL statement that is included in the page access request includes script information conforming to a format of preset script information;
- determining an XSS processing module corresponding to the access page; and
- forwarding the XSS processing module and the access page to the user device by adding an invocation statement for invoking the XSS processing module into header information of the access page, wherein the XSS processing module is executed to process XSS information on the access page when the access page is loaded by the user device.

20. The one or more computer-readable media according to claim 19, wherein obtaining the access page that is sent by the network device and is to be provided to the user device further comprises:
- forwarding the page access request to the network device, and receiving the access page that is sent by the network device and is to be provided to the user device based on the page access request if the page access request is the normal access request.

* * * * *